United States Patent
Gecht et al.

(10) Patent No.: US 7,528,974 B2
(45) Date of Patent: May 5, 2009

(54) METHODS AND APPARATUS FOR PROVIDING UNIVERSAL PRINT SERVICES AND ASYNCHRONOUS MESSAGE SERVICES

(75) Inventors: Guy Gecht, Los Altos, CA (US); Chirag Bakshi, San Jose, CA (US); Sanjay Kamble, Santa Clara, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 851 days.

(21) Appl. No.: 10/377,193

(22) Filed: Feb. 28, 2003

(65) Prior Publication Data

US 2004/0185882 A1 Sep. 23, 2004

(51) Int. Cl.
G06F 3/12 (2006.01)
(52) U.S. Cl. .................... 358/1.15; 455/456.6
(58) Field of Classification Search ............ 358/305, 358/1.1–1.9, 1.11–1.18; 455/456.6, 414; 726/26
See application file for complete search history.

(56) References Cited

U.S. PATENT DOCUMENTS

| | | |
|---|---|---|
| 5,287,194 A | 2/1994 | Lobiondo |
| 5,450,571 A | 9/1995 | Rosekrans et al. |
| 5,559,933 A | 9/1996 | Boswell |
| 5,625,757 A | 4/1997 | Kageyama et al. |
| 5,727,135 A | 3/1998 | Webb et al. |
| 5,727,156 A | 3/1998 | Herr-Hoyman et al. |
| 5,799,206 A | 8/1998 | Kitagawa et al. |
| 5,802,260 A | 9/1998 | Shimakawa et al. |
| 5,881,213 A | 3/1999 | Shaw et al. |
| 5,898,823 A | 4/1999 | Sorkin et al. |
| 5,978,560 A | 11/1999 | Tan et al. |
| 5,982,994 A | 11/1999 | Mori et al. |
| 5,987,224 A | 11/1999 | Koakutsu et al. |
| 5,995,723 A | 11/1999 | Sperry et al. |
| 6,003,069 A | 12/1999 | Cavill |
| 6,006,281 A | 12/1999 | Edmunds |
| 6,012,083 A | 1/2000 | Savitzky et al. |
| 6,023,684 A | 2/2000 | Pearson |

(Continued)

FOREIGN PATENT DOCUMENTS

DE 19641357 4/1998

(Continued)

OTHER PUBLICATIONS

"Printing documents online is easy!", kinkos.com, Inc., www.kinkos.com/print.jsp on Jan. 16, 2001.

(Continued)

Primary Examiner—King Y Poon
Assistant Examiner—Lennin R Rodriguez
(74) Attorney, Agent, or Firm—Michael A. Glenn; Glenn Patent Group

(57) ABSTRACT

Methods and apparatus are provided for providing print capability in connection with SMS messages to mobile device users. A content source communicates information regarding a print job to a mobile device user using SMS messages. The mobile device user then may obtain a hardcopy printout of the print job by designating any print device that is configured to receive print jobs via a universal printing network. The content source provides the print job to the universal printing network for delivery to the designated print device.

25 Claims, 11 Drawing Sheets

U.S. PATENT DOCUMENTS

| | | | |
|---|---|---|---|
| 6,043,898 | A | 3/2000 | Jacobs |
| 6,043,909 | A | 3/2000 | Holub |
| 6,094,679 | A | 7/2000 | Teng et al. |
| 6,125,372 | A | 9/2000 | White |
| 6,240,456 | B1 | 5/2001 | Teng et al. |
| 6,288,790 | B1 | 9/2001 | Yellepeddy et al. |
| 6,298,445 | B1 | 10/2001 | Shostack et al. |
| 6,307,640 | B1 | 10/2001 | Motegi |
| 6,327,045 | B1 | 12/2001 | Teng et al. |
| 6,334,142 | B1 | 12/2001 | Newton et al. |
| 6,337,745 | B1 | 1/2002 | Aiello et al. |
| 6,351,317 | B1 | 2/2002 | Sasaki et al. |
| 6,378,070 | B1 | 4/2002 | Chan et al. |
| 6,405,033 | B1 * | 6/2002 | Kennedy et al. ......... 455/414.1 |
| 6,405,178 | B1 | 6/2002 | Manchala et al. |
| 6,452,691 | B1 | 9/2002 | Marshall |
| 6,466,328 | B1 | 10/2002 | Bradley et al. |
| 6,474,881 | B1 * | 11/2002 | Wanda ........................ 400/61 |
| 6,490,052 | B1 | 12/2002 | Yanagidaira |
| 6,519,048 | B1 * | 2/2003 | Tanaka ..................... 358/1.13 |
| 6,615,234 | B1 | 9/2003 | Adamske et al. |
| 6,623,527 | B1 | 9/2003 | Hamzy |
| 6,708,206 | B1 * | 3/2004 | Thrane et al. ............... 709/219 |
| 7,095,518 | B1 * | 8/2006 | Keeney et al. ............. 358/1.15 |
| 2001/0037462 | A1 | 11/2001 | Bengtson |
| 2002/0016921 | A1 | 2/2002 | Olsen et al. |
| 2002/0065873 | A1 * | 5/2002 | Ishizuka .................... 709/203 |
| 2002/0145748 | A1 | 10/2002 | Nonoyama et al. |
| 2004/0033783 | A1 * | 2/2004 | Hans et al. .................... 455/73 |
| 2004/0185877 | A1 * | 9/2004 | Asthana et al. .......... 455/456.6 |

FOREIGN PATENT DOCUMENTS

| | | |
|---|---|---|
| EP | 0598513 A1 | 10/1993 |
| EP | 0872792 A2 | 3/1998 |
| EP | 0910203 A2 | 10/1998 |
| EP | 0952513 A1 | 10/1998 |
| EP | 0991227 A2 | 6/1999 |
| EP | 0974890 A2 | 7/1999 |
| EP | 0974892 A2 | 7/1999 |
| EP | 0977113 A2 | 7/1999 |
| EP | 1026576 A2 | 2/2000 |
| EP | 1 128 657 A1 | 8/2001 |
| EP | 04712881.4 | 1/2007 |
| JP | 2000-155733 | 6/2000 |
| WO | WO 02/33530 A1 | 4/2002 |
| WO | WO 02/33531 A2 | 4/2002 |
| WO | WO 02/33532 A2 | 4/2002 |
| WO | WO 02/33532 A2 | 4/2002 |
| WO | WO 02/41113 A2 | 5/2002 |
| WO | PCT/US2004/004919 | 8/2004 |
| WO | PCT/US2004/004919 | 4/2006 |

OTHER PUBLICATIONS

"kinkonet online services," kinkos.com, Inc., www.weborder.kinkos.com/frames/content.html on Jan. 16, 2001.

"hp wire at a glance," Hewlett-Packard Company, www.hpwire.com/hpwire/what_is.asp on Jan. 16, 2001.

Patrick Pidduck, "Products and Solutions," PrinterOn Corporation: the internet printing company, Jul. 27, 2000.

* cited by examiner

METHODS AND APPARATUS FOR PROVIDING UNIVERSAL PRINT SERVICES AND ASYNCHRONOUS MESSAGE SERVICES

FIELD OF THE INVENTION

This invention relates to methods and apparatus for providing print services. More particularly, this invention relates to methods and apparatus for providing print services for mobile device users via asynchronous data alert message service networks and universal printing networks.

BACKGROUND OF THE INVENTION

Portable wireless communication devices, such as pagers, personal digital assistants ("PDAs"), cell phones, wireless handheld devices, handheld computers and other portable wireless communication devices, referred to herein collectively as "Mobile Devices," have become increasingly popular within the last decade. Mobile Devices variously permit users to send and receive email, text messages, instant messages and documents, and to make and receive wireless telephone calls. As this technology evolves, Mobile Devices are being developed that perform all of these functions. For example, cell phones are now available that may be used not only to make and receive telephone calls, but also to send and receive email and text messages, browse the Internet, and perform other PDA tasks. Additionally, PDAs also now are available that include email, text messaging, Web browsing and wireless telephone functionality.

Most Mobile Devices now typically include some form of advanced non-speech service, such as short message service ("SMS"), multimedia message service ("MMS") or other asynchronous data alert message service. SMS is a subscriber service that operates similar to pager service. With SMS, a Mobile Device user may receive and transmit "short" text messages without establishing a voice circuit connection. These short text messages typically are limited to about 160 alphanumeric characters, and are transmitted on a control channel typically separate from the band used for voice transmission. MMS is a relatively new subscriber service that is similar to SMS, but permits communication of longer text messages, plus images, audio and video. Unless otherwise stated, SMS, MMS, and other asynchronous data alert message services will be collectively referred to herein by the acronym "SMS services." In addition, the term "SMS messages" is used herein to refer to any message communicated via an SMS, MMS, or other similar asynchronous data alert message service. Thus, SMS messages may include text data, image data, audio data, video data, and any other data that may be communicated via an asynchronous data alert message service. SMS services may be provided between Mobile Device users on the same cellular network or on different cellular networks, and between content providers and mobile device users via a network gateway.

A content provider may use SMS messaging to send targeted SMS messages to specific mobile device users. For example, a news service may use SMS messaging to provide subscribers with periodic highlights of news related to selected subject areas, such as sports, finance, world events, or other selected subject areas. Alternatively, a manufacturing company may use SMS messaging to inform its sales force of updated product pricing information. In addition, an investment advisory service may use SMS messaging to provide its clients with updated investment advice regarding particular securities.

In each of these examples, a mobile device user may receive an SMS message and then desire additional content related to the message. As used herein, content refers to documents, images, audio, video, text and any other similar information that may be represented and stored in digital form. For example, a mobile device user may receive an SMS message from an investment advisor regarding a particular company, and then wish to read a prospectus about the company. Such a prospectus may be quite lengthy, and may be impractical to view on the mobile device. Alternatively, the user may receive an SMS message from a realtor regarding a particular property, and may wish to see an image or series of images of the property. The user's mobile device, however, may not be able to display the image with sufficient clarity. In both instances, the mobile device user may simply prefer to obtain a hardcopy print of the prospectus or images. Further, depending on the nature of the content, the content provider may not want to transfer a copy of the content to mobile device user, and may want to limit the number of copies that the mobile device user may make of the content.

Previously known techniques for printing documents from a Mobile Device, however, typically have been limited to printing documents displayed on or stored on the Mobile Device. For example, Ishizuka U.S. Patent Publication No. US 2002/0065873 A1 ("Ishizuka") describes methods and systems for printing from a wireless Mobile Device via the Internet. Ishizuka's methods are limited to printing documents stored or displayed on a mobile device, and are limited to printing documents to a user's default printer (which may be located far from the user at the time the user desires to print the document), or at an alternate printer (which requires that the user provide the network address for the printer). A mobile user may not know the network address of a local printer, or there may simply be no network printer readily accessible to the user. Moreover, many Mobile Devices lack the ability to display or store many type of documents that a user may wish to view and print. For example, a document may be too large to store locally on a Mobile Device. Even if the Mobile Device may be able to store the document, the Mobile Device may lack software needed to view and print the document.

Many other previously known techniques for printing documents from a Mobile Device require that the Mobile Device connect to a printer via a cable or wireless link (e.g., via an infrared link). This is disadvantageous, however, because a mobile user may not have a printer cable that is compatible with a local printer, or may not have a Mobile Device that can communicate via a wireless link to a local printer. Also, the local printer may not include technology for receiving print jobs via wireless communications.

In view of the foregoing, it would be desirable to provide methods and apparatus that permit a content provider to send SMS messages to a Mobile Device user, and then permit the Mobile Device user to print content related to the received messages.

It also would be desirable to provide methods and apparatus that permit Mobile Device users to print content related to received SMS messages without requiring a copy of the content on the Mobile Device.

It additionally would be desirable to provide methods and apparatus that permit a Mobile Device user to print content related to received SMS messages without needing special software on the Mobile Device to view and print the content.

It further would be desirable to provide methods and apparatus that permit a Mobile Device user to print content related to received SMS messages at a printer, without requiring that the user know in advance an address for the printer.

It also would be desirable to provide methods and apparatus that permit a Mobile Device user to print content related to a received SMS message to a printer, without requiring that the user know a network address of the printer.

SUMMARY OF THE INVENTION

In view of the foregoing, it is an object of this invention to provide methods and apparatus that permit a content provider to send SMS messages to a Mobile Device user, and then permit the Mobile Device user to print content related to the received messages.

It also is an object of this invention to provide methods and apparatus that permit Mobile Device users to print content related to received SMS messages without requiring a copy of the content on the Mobile Device.

It additionally is an object of this invention to provide methods and apparatus that permit a Mobile Device user to print content related to received SMS messages without needing special software on the Mobile Device to view and print the content.

It further is an object of this invention to provide methods and apparatus that permit a Mobile Device user to print content related to received SMS messages at a printer, without requiring that the user know in advance an address for the printer.

It also is an object of this invention to provide methods and apparatus that permit a Mobile Device user to print content related to a received SMS message to a printer, without requiring that the user know a network address of the printer.

These and other objects of this invention are accomplished by providing communication systems and methods that provide universal print capability and SMS message services to Mobile Device users. In particular, communication systems are provided that include a content source coupled to a Mobile Device via a wireless system that includes SMS capability, and to a print device via a universal printing network. The content source may communicate information regarding a print job to a Mobile Device user using SMS messages. The Mobile Device user may then obtain a hardcopy printout of the print job by designating any print device that is configured to receive print jobs via the universal printing network. If the user elects to obtain a printout of the print job, the content source provides the print job to the universal printing network for delivery to the designated print device.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION OF THE INVENTION

The present invention provides methods and apparatus for providing print capability in connection with SMS messages to Mobile Device users. In particular, a content source may communicate information regarding a print job to a Mobile Device user using SMS messages. The Mobile Device user then may be provided with the ability to obtain a hardcopy printout of the print job by designating any print device that is configured to receive print jobs via a universal printing network. If the user elects to obtain a printout of the print job, the content source provides the print job to the universal printing network for delivery to the designated print device.

Figure 1:
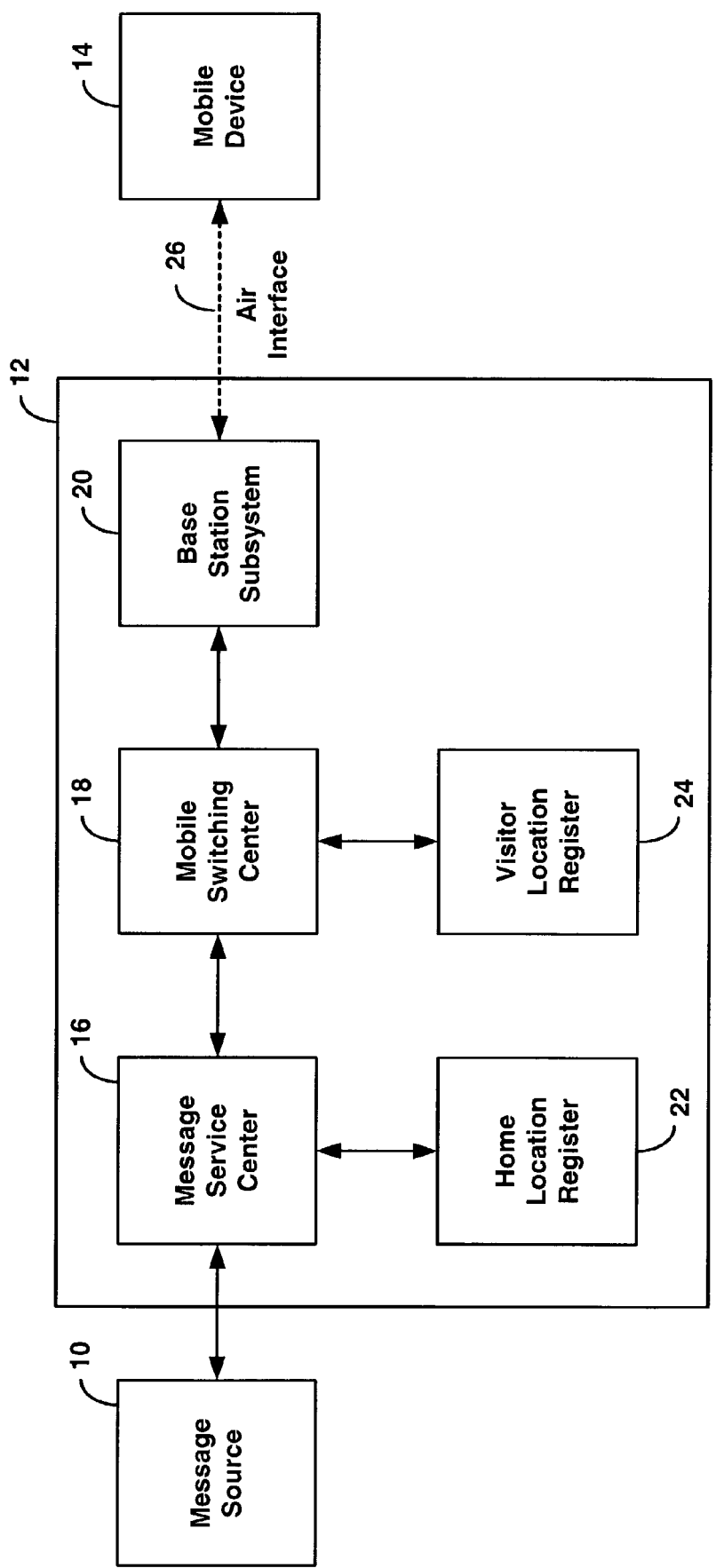
FIG. 1 is a block diagram of a previously known wireless network including SMS capability.

Referring to FIG. 1, a previously known communication system is described that includes SMS message service capability. Message source 10 is coupled to Mobile Device 14 via wireless communication system 12. Message source 10 may be any source of SMS messages, such as voice mail systems, paging networks, wireless handheld devices, email systems, and other similar SMS message sources. Message source 10 also may include gateways to other networks. SMS messages provided by message source 10 may include email notification, pages, interactive banking messages, stock quotes, airline flight schedule and status information, and other similar messages. Although only one message source 10 and one Mobile Device 14 are illustrated in FIG. 1, wireless system 12 typically may be used to couple one or more message sources to one or more Mobile Devices.

Wireless system 12 includes message service center ("SMSC/MMSC") 16, which is coupled via mobile switching center ("MSC") 18 to base station subsystem ("BSS") 20. Wireless system 12 also typically includes Home Location Register ("HLR") 22 and Visitor Location Register ("VLR") 24. SMSC/MMSC 16 receives SMS messages from message source 10 and delivers the messages to Mobile Device 14. SMSC/MMSC 16 also may receive SMS messages from Mobile Device 14 for delivery to message source 10. MSC 18 performs switching and call control functions, and transmits and receives SMS messages to and from SMSC/MMSC 16 and Mobile Device 14. BSS 20 handles the wireless communications (e.g., radio frequency transmission and reception of voice and data traffic) to and from Mobile Device 14 via air interface 26. HLR 22 provides information to SMSC/MMSC 16 regarding the availability of an intended Mobile Device 14, and the appropriate MSC that services the intended recipient. In some previously known communication systems, HLR 22 also may communicate directly with MSC 18. VLR 24 provides information to MSC 18 about visiting subscribers using Mobile Devices 14.

In operation, message source 10 typically provides SMS messages to SMSC/MMSC 16 via an air or wire interface. SMSC/MMSC 16 formats the message as part of a data packet using, for example, the Transaction Capability Application Part ("TCAP") of the Signaling System #7 standard written by Committee Centrale Internationale Telephone and Telegraphique ("CCITT"). MSC 18 switches the formatted message to BSS 20, which transmits the formatted message via air interface 26 to Mobile Device 14. Mobile Device 14 may subsequently reply to the SMS message by sending an SMS message using an inverse path to message source 10.

Figure 2:
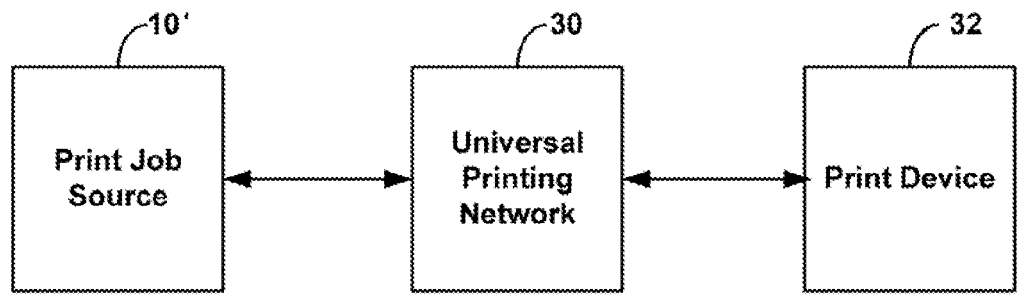
FIG. 2 is a block diagram of a previously known universal printing network.

Referring now to FIG. 2, a previously known universal printing network is described. Universal printing network 30 may be any suitable mobile and Internet printing network that allows users to send documents from a print job source 10', such as a Smartphone, personal computer, PDA, two-way pager or any Internet-enabled cell phone, to print device 32, which may be a single printer or a pool of printers coupled via a print server. Print device 32 may be any conventional print device, such as an inkjet printer, laser printer, copier, facsimile machine, or any other similar conventional print device. For example, universal printing network 30 may be a printing network such as described in Gecht et al. U.S. application Ser. No. 09/688,457, filed Oct. 16, 2000, now U.S. Pat. No. 6,859,832, the disclosure of which is incorporated by reference herein in its entirety.

Figure 3:
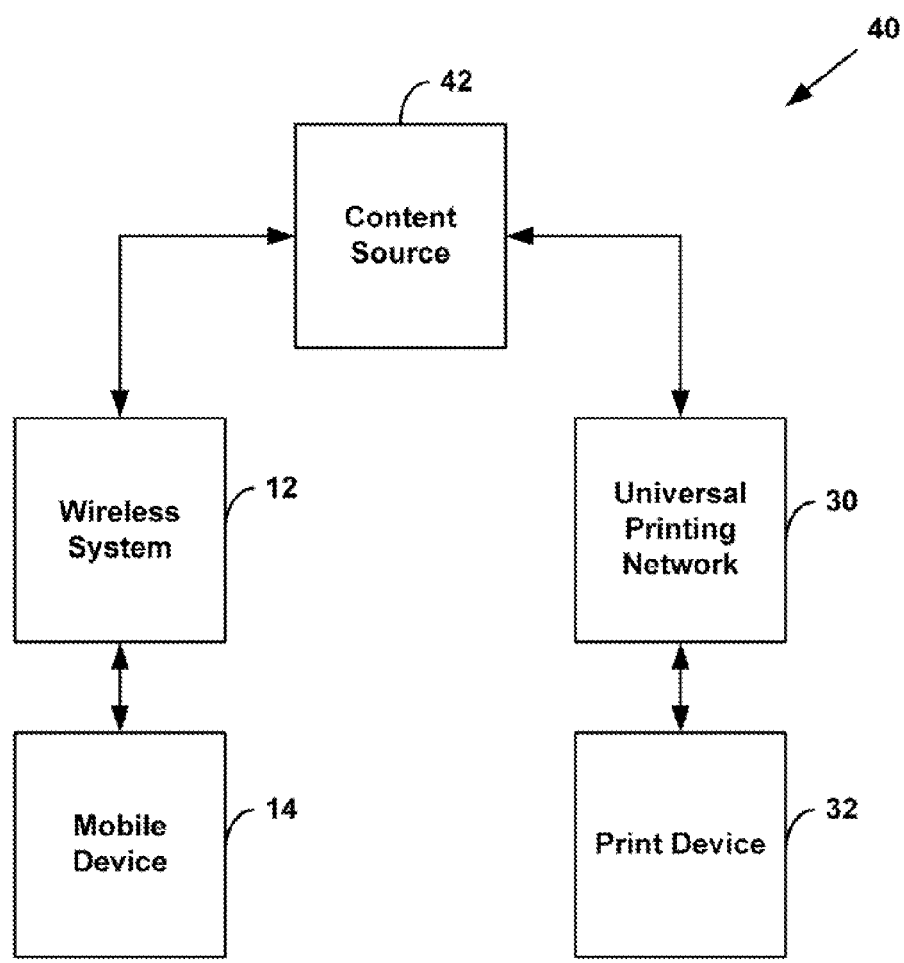
FIG. 3 is a block diagram of an exemplary embodiment of enhanced communication systems in accordance with this invention.

Referring now to FIG. 3, an exemplary embodiment of communication systems for providing SMS messages with print capability in accordance with this invention is described. Enhanced communication system 40 includes Content Source 42, which is coupled to Mobile Device 14 via wireless system 12, as in FIG. 1, and also is coupled to print device 32 via universal printing network 30, as in FIG. 2. Content Source 42 may be any suitable device, combination of devices, or combination of hardware and software that may provide SMS messages to Mobile Device 14 and print jobs to universal printing network 30. Content Source 42 may include any suitable source of SMS messages, such as voice mail systems, paging networks, wireless handheld devices, email systems, other sources and gateways to other networks. Content Source 42 also may include any suitable source of print jobs, such as a personal computer and print driver, a web browser, a facsimile machine, a scanner, a telephone, an Internet appliance, a two-way pager, a PDA, or the like.

Print jobs provided by Content Source 42 may include, for example, a document provided by a content provider. The content provider may be a newspaper, a magazine, a periodical, a document provider, a graphic arts provider, a notification service, an Internet content provider, a merchant, a financial institution, a government agency, a shipping company, an airline, or the like. The print job may include, for example, a document, a poster, an image, a coupon, a ticket, a certificate, a check, a list, a schedule, a periodical, a unit of currency, a negotiable instrument, a stamp, a bill of lading, a lottery or gaming ticket, a token, a food stamp, a license, a permit, a pass, a passport, a ballot, a citation, identification, a copy-protection key, a proof-of-purchase, a warranty, a receipt, a transcript, a library card, a prospectus, a financial statement, or any other printable subject matter. Print jobs may be page description language ("PDL") files, such as PostScript and PCL files, PDF files, or any other files used for networked printing.

Content Source 42 may include a single device such as a personal computer, computer server, telephone, Internet appliance, PDA, or the like, or may include multiple devices such as one or more personal computers, computer servers, telephones, Internet appliances, PDAs, or the like. Content Source 42 may be provided by a single source, such as an individual, a company, a government entity, or the like, or may be provided by multiple sources, such as groups of individuals, companies, government entities, or various combinations of such individuals, companies and entities. The functions of providing SMS messages and print jobs may be provided by a single device, or may be distributed amongst multiple devices collocated at a single location or dispersed over more than one location.

Figure 4:
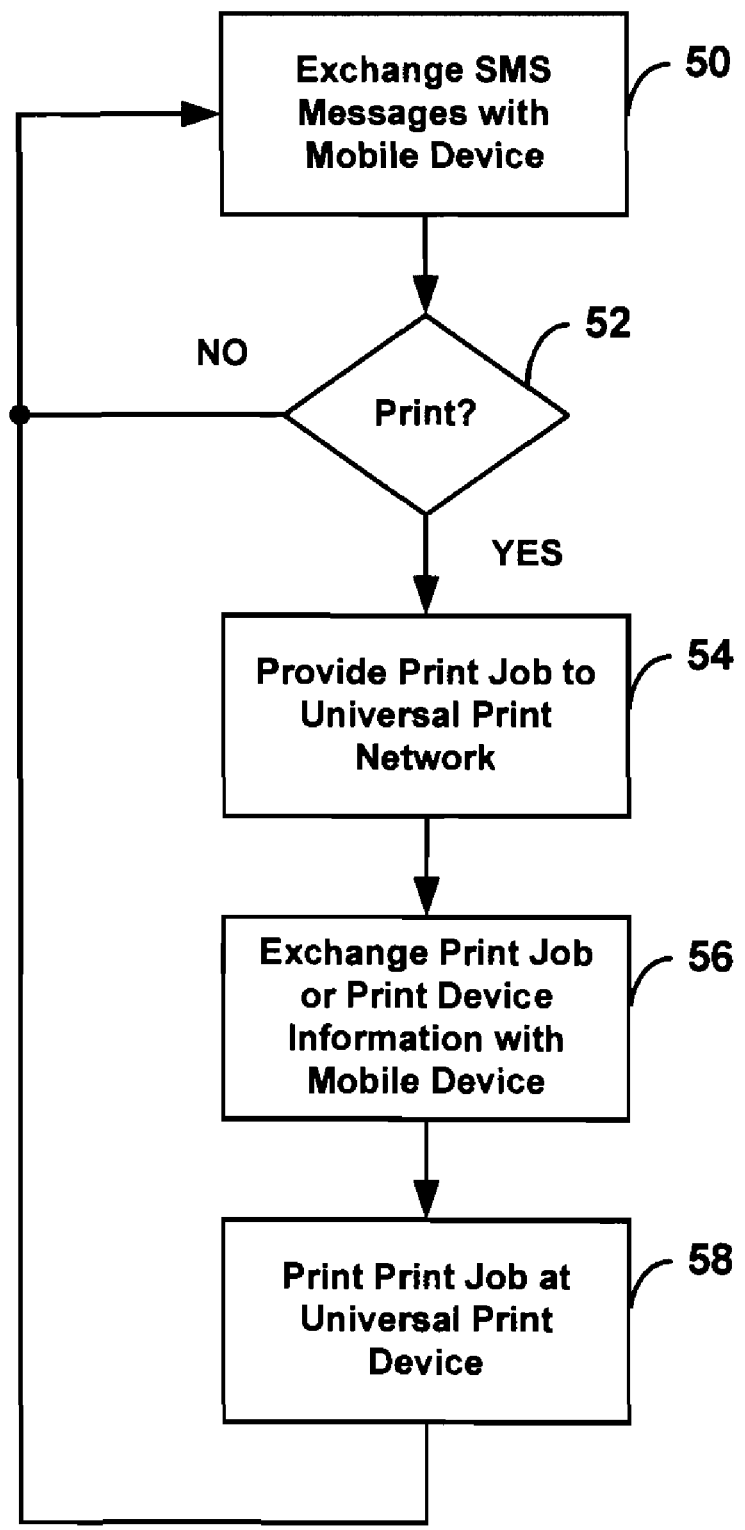
FIG. 4 is a flow diagram of an exemplary process for providing SMS messages with universal print capability to Mobile Device users in accordance with this invention.

Referring now to FIGS. 3 and 4, an exemplary process by which Content Source 42 may provide SMS messages with print capability in accordance with this invention is described. At step 50, Content Source 42 exchanges SMS messages with Mobile Device 14 via wireless system 12. As described in more detail below, this SMS message exchange may originate either at Content Source 42 or Mobile Device 14, and may be initiated in response to preselected message alert criteria established by a user of the Mobile Device. At step 52, Content Source 42 transmits an SMS message via wireless system 12 to Mobile Device 14, providing an option to print a print job. The print job typically is related to the SMS messages exchanged in step 50, but also may be unrelated to that message exchange. In response to this query, Mobile Device 14 indicates "YES" to print the print job, or "NO" to decline printing the print job. Mobile Device 14 may communicate this response to Content Source 42 with a reply SMS message, or by using any other technique for communicating with Content Source 42.

If the user decides not to print the print job, Content Source 42 and Mobile Device 14 may continue to exchange SMS messages at step 50. If, however, the mobile user decides to print the print job, at step 54, Content Source 42 provides the print job to universal printing network 30. As part of this step, universal printing network 30 may provide Content Source 42 with a document ID that is uniquely associated with the print job. If Content Source 42 previously provided the print job to universal printing network 30, step 54 may be bypassed.

Next, at step 56, Content Source 42 and Mobile Device 14 exchange information that identifies the print job, or identifies the print device that should print the print job. For example, Content Source 42 may send Mobile Device 14 a message that includes the document ID associated with the print job. The message may be sent via SMS, email, or any other suitable method for communicating the document ID to the mobile user. Alternatively, Mobile Device 14 may send Content Source 42 a message that includes an address associated with a specific print device that the user desires to receive the print job. In other exemplary embodiments, Mobile Device 14 may send Content Source 42 a telephone number associated with a fax machine that the user desires to receive the print job.

Next, at step 58, print device 32 prints the print job. If Content Source 42 provided a document ID to the user, the user may obtain a print of the print job by providing the document ID to any print device coupled to universal printing network 30. Alternatively, if the user specified the address of a print device coupled to universal printing network 30, the specified print device will print the print job. Otherwise, if a user specified a telephone number for a fax machine, the fax machine will receive and print the print job. After the print job has been printed, Content Source 42 and Mobile Device 14 may continue to exchange SMS messages via wireless network 12 at step 50.

Figure 5:
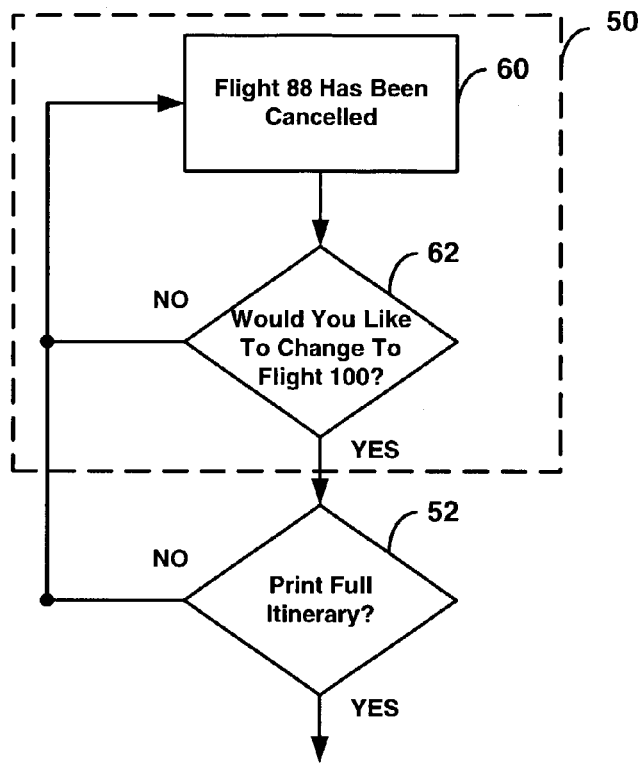
FIG. 5 is an exemplary SMS message exchange of FIG. 4.

Referring now to FIGS. 4 and 5, an example of the SMS message exchanges of steps 50 and 52 are described. In this example, SMS messages are exchanged with a Mobile Device user regarding transportation information. Beginning at step 60, Content Source 42 provides a user of Mobile Device 14 with transportation status information. For example, Content Source 42 may be an airline providing a mobile passenger with an SMS message indicating that the passenger's scheduled flight has been cancelled. At step 62, Content Source 42 may provide Mobile Device 14 with an SMS message that asks if the user would like to change to alternate flight 100 that is available. The passenger may then reply via an SMS message indicating "YES" or "NO." If the passenger desires to change the reservation, at step 52 Content Source 42 may provide the user with an opportunity to print a full revised travel itinerary. If the user selects "YES," the process proceeds as described above in connection with FIG. 4 at step 54.

Figure 6:
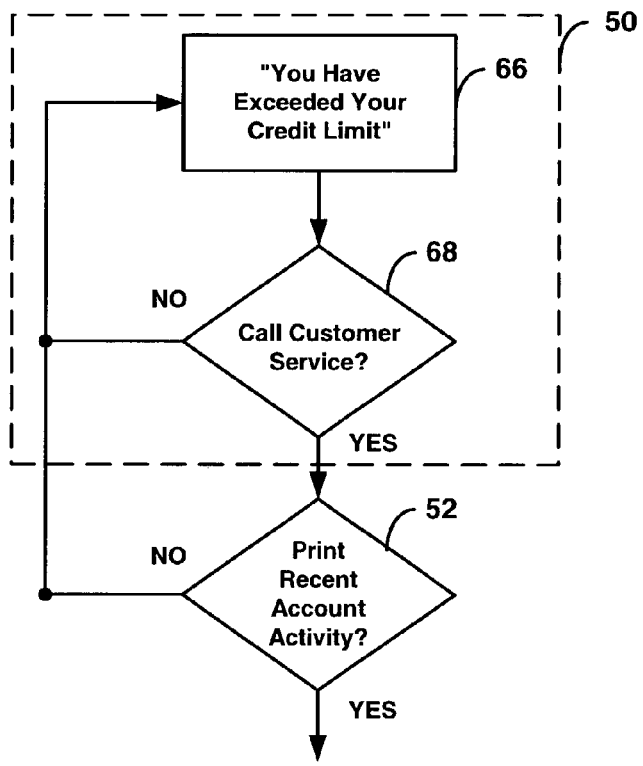
FIG. 6 is an alternative exemplary SMS message exchange of FIG. 4.

Referring now to FIGS. 4 and 6, another example of the SMS message exchanges of steps 50 and 52 are described. In this illustrative example, SMS messages are exchanged with a Mobile Device user regarding financial information, such as credit card status information. At step 66, Content Source 42 provides a user of Mobile Device 14 with an audio SMS message regarding spending status information. For example, Content Source 42 may be a bank providing a mobile customer with an audio message indicating that the customer has exceeded her credit limit. At step 68, Content Source 42 may provide Mobile Device 14 with an audio SMS message that asks if the user would like to call the bank's credit card customer service department. The customer may then reply via an SMS message indicating "YES" or "NO." If the customer desires to contact customer service, at step 52 Content Source 42 may provide the user with an opportunity to print a report showing recent account activity. If the user selects "YES," the process proceeds as described above in connection with FIG. 4 at step 54.

Figure 7:
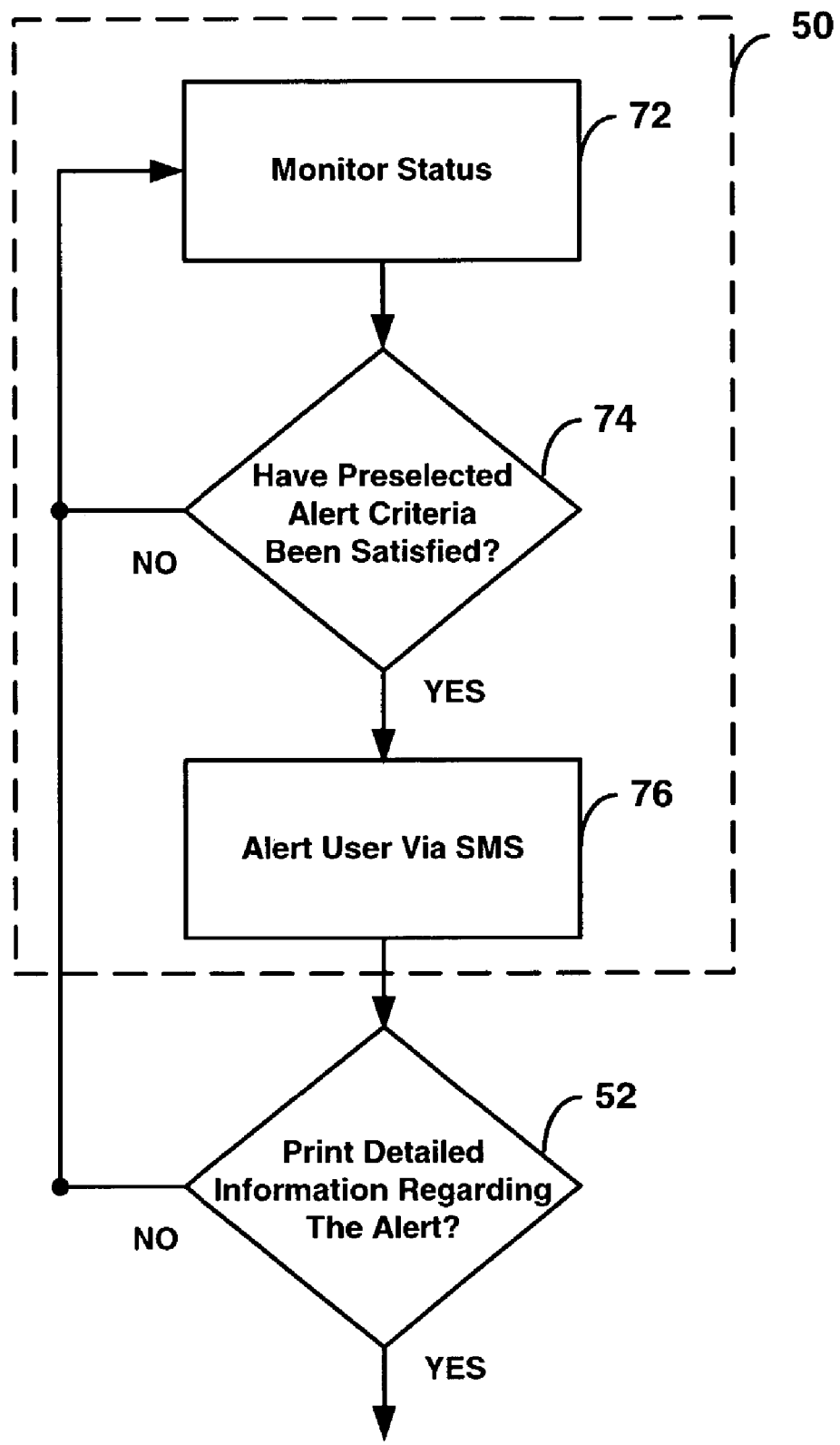
FIG. 7 is another alternative exemplary SMS message exchange of FIG. 4.

Referring now to FIGS. 4 and 7, still another example of the SMS message exchanges of steps 50 and 52 are described. In this illustrative example, SMS messages are exchanged with a Mobile Device user regarding preselected alert criteria. For example, Content Source 42 may permit a Mobile Device user to establish preselected criteria, such that on the occurrence of the criteria, the Content Source alerts the user via an SMS message. For example, Content Source 42 may be an investment portfolio manager that monitor's a customer's stock portfolio. The customer may have selected an alert criteria related to the price of a particular stock in her portfolio. For instance, a customer may want to sell her shares in XYZ Company stock if the price drops below a specific amount. At step 72, Content Source 42 monitors the price of XYZ Company stock. At step 74, Content Source 42 periodically checks to see if the alert criteria have been satisfied, that is, if price of XYZ Company stock has dropped below the specified amount. If the stock price has not fallen below the criteria, Content Source 42 continues to monitor the status at step 72. If, however, the stock price has fallen below the specified price and the stock is sold, at step 76 Content Source 42 may provide Mobile Device 14 with an audio/video SMS message informing the customer about the sale. At step 52, Content Source 42 may provide the customer with an opportunity to print a detailed trade report. If the user selects "YES," the process proceeds as described above in connection with FIG. 4 at step 54.

Figure 8:
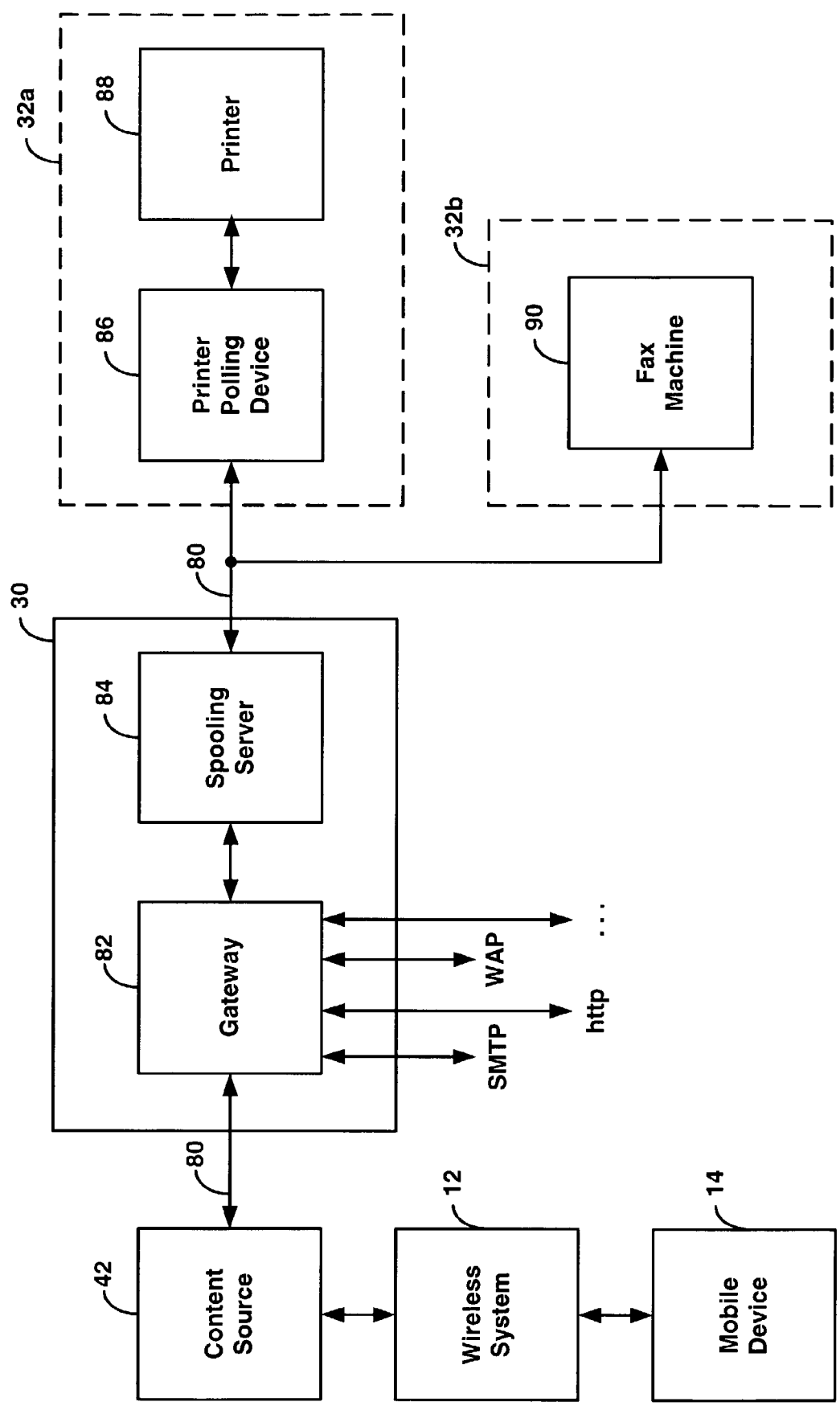
FIG. 8 is a block diagram of an exemplary embodiment of the communication system of FIG. 3.

Referring now to FIG. 8, a more detailed exemplary embodiment of systems in accordance with this invention is described. Universal printing network 30 includes printing gateway 82 and spooling server 84, coupled via network 80 to one or more print devices 32. Print device 32a includes printer polling device 86 and printer 88. Print device 32b includes fax machine 90. Although FIG. 8 illustrates only one print device 32a and one print device 32b, universal printing network 30 may be coupled to one or more print devices 32a and one or more print devices 32b. Gateway 82 provides interfaces between spooling server 84 and various sources of print jobs. As shown in FIG. 8, gateway 82 may provide an interface to spooling server 84 via SMTP, http, WAP, and other protocols. Gateway 82 also provides an interface to spooling server 84 via network 80, which may comprise a local area network, a wide area network, a global network, the Internet, public switched telephone networks, wireless networks, satellite networks, or the like. Network 80 may consist of multiple interconnected networks having multiple gateways and other features as is well known in the art.

Content Source 42 may be connected to network 80 using Dynamic Host Configuration Protocol ("DHCP protocol"), or any other suitable network configuration protocol. Although FIG. 8 illustrates only one Content Source 42, one or more Content Sources may be coupled via network 80 to universal printing network 30. Content Source 42 provides print jobs to spooling server 84 via gateway 82. Spooling server 84 may store one or more print jobs in one or more spooling queues. Such print jobs may be stored using any conventional technique, such as methods used to store print jobs on a printer spooler. Spooling server 84 may maintain a spooling queue that associates print jobs with a unique personal identification number ("PIN"). Alternatively, spooling server 84 may maintain a queue that associates print jobs with unique identification numbers, or with identification numbers associated with unique print devices 32.

Printer polling device 86 is capable of polling spooling server 84 via network 80 to identify a print job associated with the printer polling device. Printer polling device 86 may be connected to network 80 using DHCP protocol, or any other suitable network configuration protocol. Printer polling device 86 may be a stand-alone device connected to one or more printers 88 via a standard printer port, integrated into the firmware of printer 88, integrated into the software of a network print server, or any other suitable configuration. Printer polling device 86 uses "pull" technology, which polls spooling server 84 so that the spooling server does not have to initiate a connection to printer 88. The printer polling function may also be integrated into the software of a print server such as those manufactured by Electronics for Imaging, Inc. (Foster City, Calif.) under the trademarks Fiery®, EDOX® and Splash®. Printer polling device 86 may periodically poll spooling server 84 to identify a print job associated with the printer polling device. Printer polling device 86 may comprise a user interface, a connection to network 80, and a connection to printer 88. Fax machine 90 may be any conventional fax machine that may be connected to network 80 using a conventional telephone jack or any other suitable connection.

When printer polling device 86 polls spooling server 84, the spooling server checks to see if the queue for print device 32 contains any print jobs. When spooling server 84 identifies a print job waiting to be printed, the data for that print job is retrieved from the file system, reformatted in a form suitable for printer 88, and transmitted to printer polling device 86. Printer 88 may be a single printer or a pool of printers coupled via a print server. Printer 88 may be any conventional print device, such as an inkjet printer, laser printer, copier, facsimile machine, or any other similar conventional print device. If a print job is designated to be printed at fax machine 90, spooling server retrieves the data for that print job from the file system, reformats the data in a form suitable for fax machine 90, and transmits the print job to the fax machine.

Content Source 42 may be located at and in communication with a first local area network and printer polling device 86 may be located at and in communication with a second local area network. Spooling server 84 may be located outside of the first and second local area networks. Content Source 42 may communicate with spooling server 84 via a first gateway firewall which controls access to the first local area network, and printer polling device 86 may communicate with spooling server 84 via a second gateway firewall which controls access to the second local area network. Because the communications amongst Content Source 42, spooling server 84, and printer polling device 86 may travel across public networks, it may be desirable to protect any proprietary or confidential information that may be embodied in the print jobs. For example, Content Source 42 may encrypt the print job, and printer polling device 86 may decrypt the print job.

As described above, Content Source 42 may provide the print job to spooling server 84 without a pre-determined print destination. For example, if Content Source 42 provides a user with a document ID associated with a print job, the user may provide the document ID to printer polling device 86, which will then poll spooling server 84 to communicate the identification of the desired print destination for the identified print job. The user need not know anything more about print device 32 than its location or identification number (such as a phone number) that uniquely identifies the print device. Alternatively, if a user provides an address associated with a specific print device, Content Source 42 may communicate the address to spooling server 84. The print job may be printed at the specified print device when the printer polling device at the desired print device polls spooling server 84. If the user has specified a phone number associated with fax machine 90 for receiving the print job, Content Source 42 may communicate the phone number to spooling server 84, which then will fax the document to the fax machine.

Figure 9:
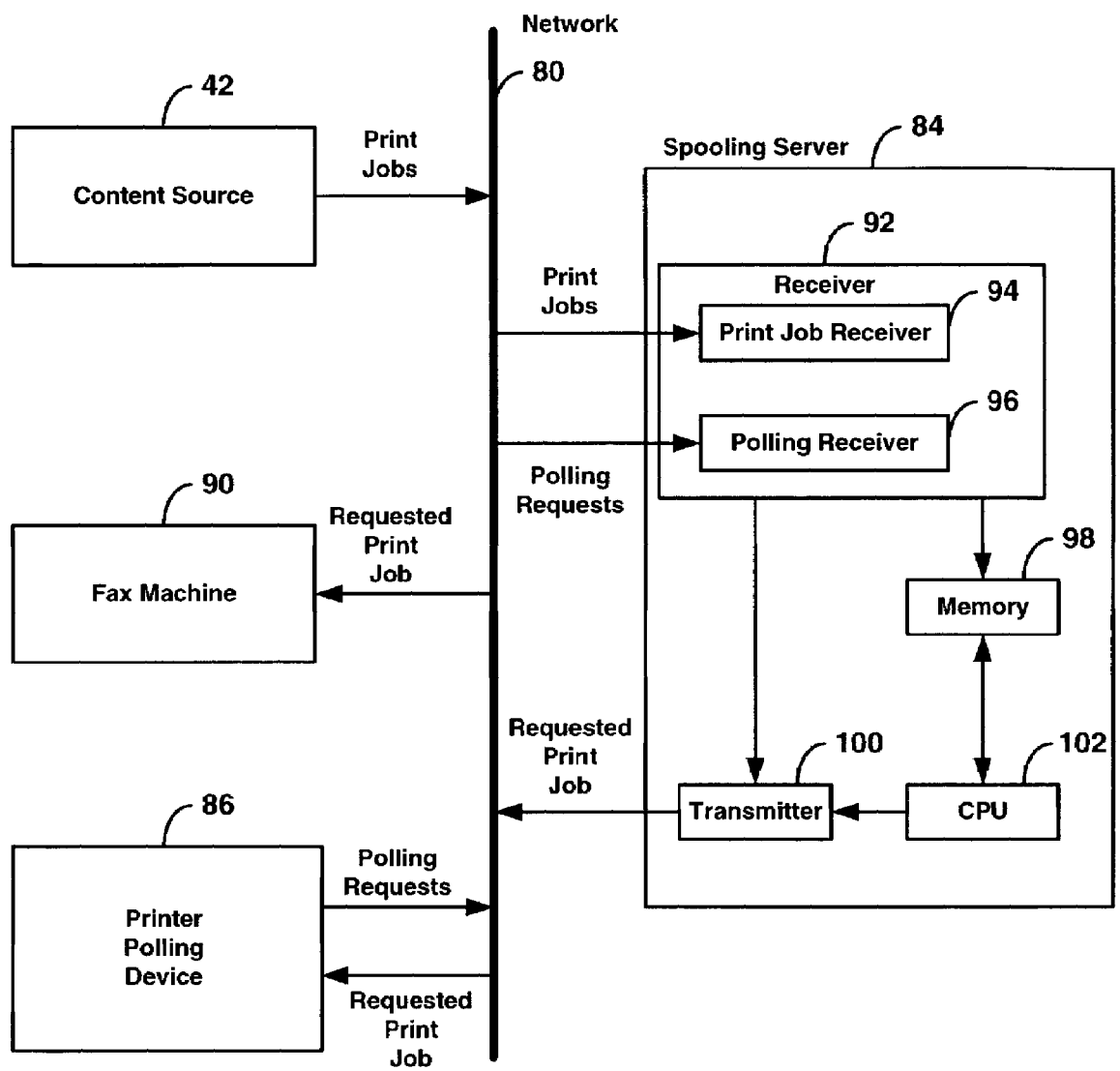
FIG. 9 is a block diagram of an exemplary embodiment of the spooling server of FIG. 8.

Referring now to FIG. 9, an exemplary embodiment of spooling server 84 is described. A receiver 92 is provided which is capable of receiving print jobs from Content Source 42 and receiving polling requests from printer polling device 86. Receiver 92 may include print job receiver 94 for receiving print jobs and polling receiver 96 for receiving polling requests. When receiver 92 receives a print job, spooling server 84 stores the print job in memory 98, which may comprise random access memory ("RAM"), magnetic or optical storage media, or any other read/write memory device. If Content Source 42 provides the print job with a telephone number associated with a fax machine, spooling server 84 will communicate the print job to the specified fax machine via transmitter 100.

When receiver 92 receives a polling request for a specific print job from printer polling device 86, spooling server 84 will determine whether the requested print job is stored in memory 98, and if so, forward the requested print job to printer polling device 86 via transmitter 100. When receiver 92 receives a polling request for print jobs associated with printer polling device 86, spooling server 84 will determine whether memory 98 includes any print jobs associated with the polling device, and if so, forward the associated print jobs to printer polling device 86 via transmitter 100. Processor 102 enables the spooling server to search for, retrieve, and/or reformat the print job for delivery to printer polling device 86 and/or fax machine 90.

Figure 10:
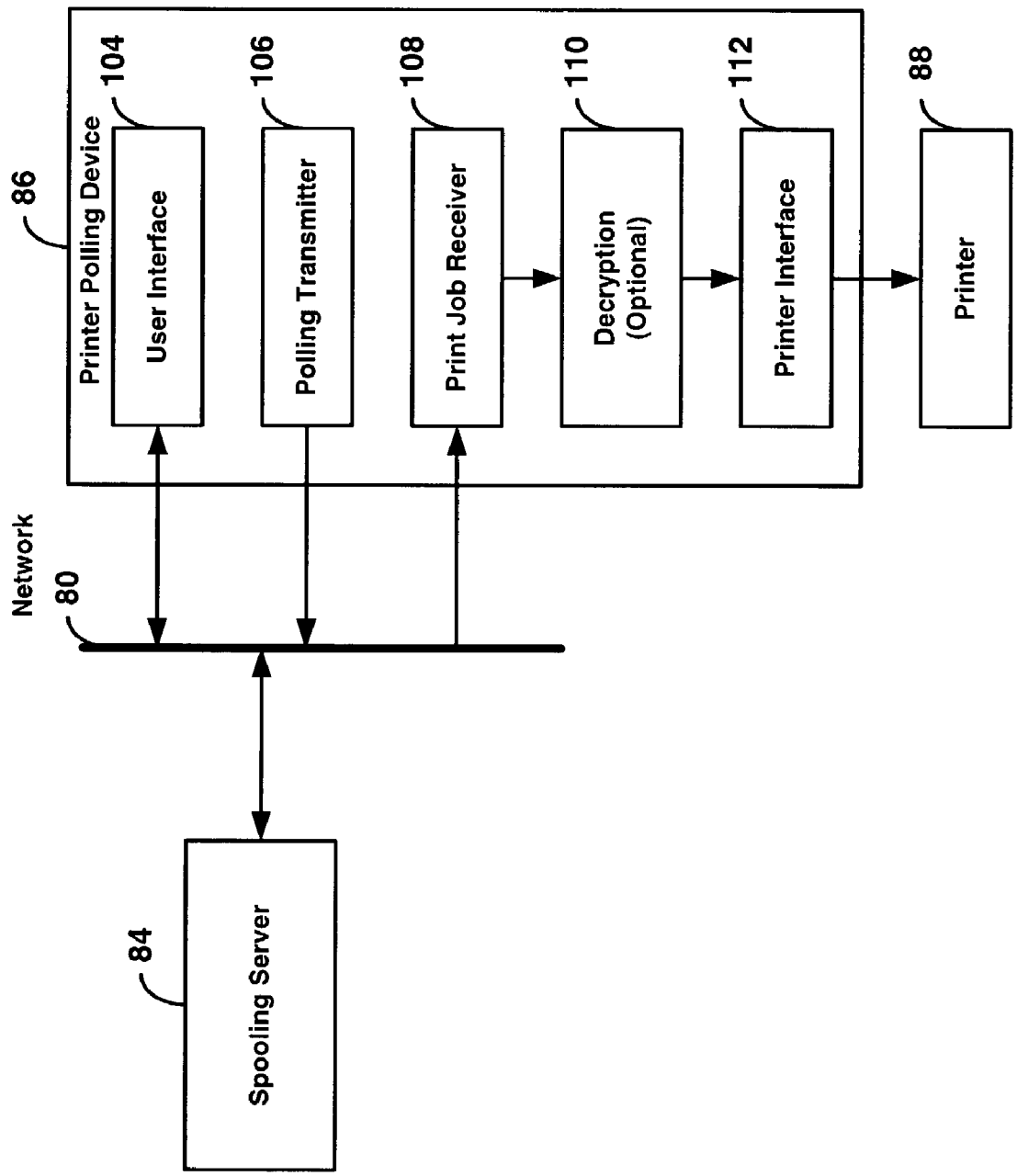
FIG. 10 is a block diagram of an exemplary embodiment of the printer polling device of FIG. 8.

Referring now to FIG. 10, an exemplary embodiment of printer polling device 86 is described. The printer polling device may optionally include a user interface 104 for enabling communications with the spooling server 84 (e.g., providing a password or document ID to spooling server 84). Polling transmitter 106 transmits polling requests to spooling server 84 via network 80 to identify a print job stored at spooling server 84. Print job receiver 108 receives the identified print job from spooling server 84 via network 80. Decryption 110 of an encrypted print job may optionally be provided by printer polling device 86. Printer interface 112 enables printer polling device 86 to forward the print job to printer 88 for printing.

Figure 11:
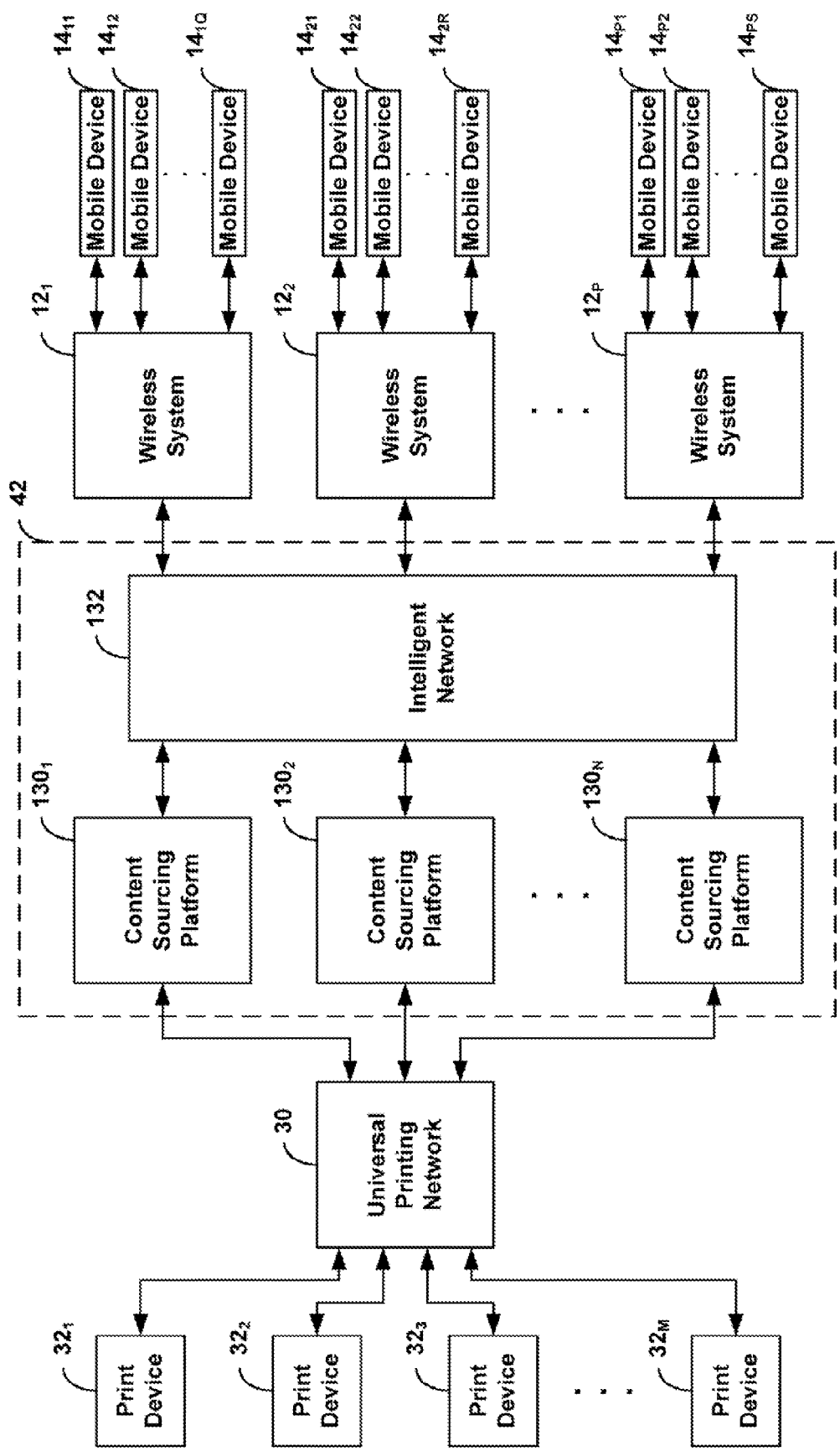
FIG. 11 is a block diagram of an alternative exemplary embodiment of enhanced communication systems in accordance with this invention.

Referring now to FIG. 11, an alternative exemplary embodiment of systems in accordance with this invention is described. In this embodiment, Content Source 42 is coupled via universal printing network 30 to one or more print devices $32_1, 32_2, 32_3, \ldots 32_M$. Each of print devices $32_1, 32_2, 32_3, \ldots 32_M$ may include a corresponding printer polling device and printer, or may be a fax machine, as described above in connection with FIG. 8. Content Source 42 includes one or more content sourcing platforms $130_1, 130_2, \ldots 130_N$, each of which may provide print jobs via universal printing network 30 to any of print devices $32_1, 32_2, 32_3, \ldots 32_M$. Each of content sourcing platforms $130_1, 130_2, \ldots 130_N$ also may provide SMS messages to any of Mobile Devices $14_{11}, 14_{12}, \ldots 14_{1Q}, 14_{21}, 14_{22}, \ldots, 14_{2R}, \ldots,$ and $14_{P1}, 14_{P2}, \ldots, 14_{PS}$ via intelligent network 132 and wireless systems $12_1, 12_2, \ldots, 12_P$.

Wireless systems $12_1, 12_2, \ldots, 12_P$ may be unique wireless systems that provide SMS service. For example, wireless system $12_1$ may be a wireless system that uses the Global System for Mobile Communications ("GSM"), wireless system $12_2$ may be a wireless system that uses the Personal Communications Standard ("PCS") using code division multiple access ("CDMA") methods, and wireless system $12_P$ may be a wireless system that uses time division multiple access ("TDMA") methods. Each of wireless systems $12_1, 12_2, \ldots, 12_P$ may be operated by different carriers, or may be operated by a single carrier. Wireless system $12_1$ may communicate over a first air interface to Mobile Devices $14_{11}, 14_{12}, \ldots, 14_{1Q}$, wireless system $12_2$ may communicate over a second air interface to Mobile Devices $14_{21}, 14_{22}, \ldots, 14_{2R}$, wireless system $12_3$ may communicate over a third air interface to Mobile Devices $14_{P1}, 14_{P2}, \ldots, 14_{PS}$, and so on.

Content sourcing platforms $130_1, 130_2, \ldots, 130_N$ may communicate with Intelligent Network 132 via a local area network, a wide area network, a global network, the Internet, public switched telephone networks, wireless networks, satellite networks, or the like. Each of content sourcing platforms $130_1, 130_2, \ldots, 130_N$ may be located separately from Intelligent Network 132, and may be located separately from one another. In addition, universal printing network 30 may be located separately from content sourcing platforms $130_1, 130_2, \ldots, 130_N$ Intelligent Network 132, and Wireless Systems $12_1, 12_2, \ldots, 12_P$. Intelligent Network 132 is an intelligent gateway that may be used to enable each of message sourcing platforms $130_1, 130_2, \ldots, 130_N$ to communicate via any of wireless systems $12_1, 12_2, \ldots, 12_P$ to mobile devices associated with those wireless systems.

Figure 12:
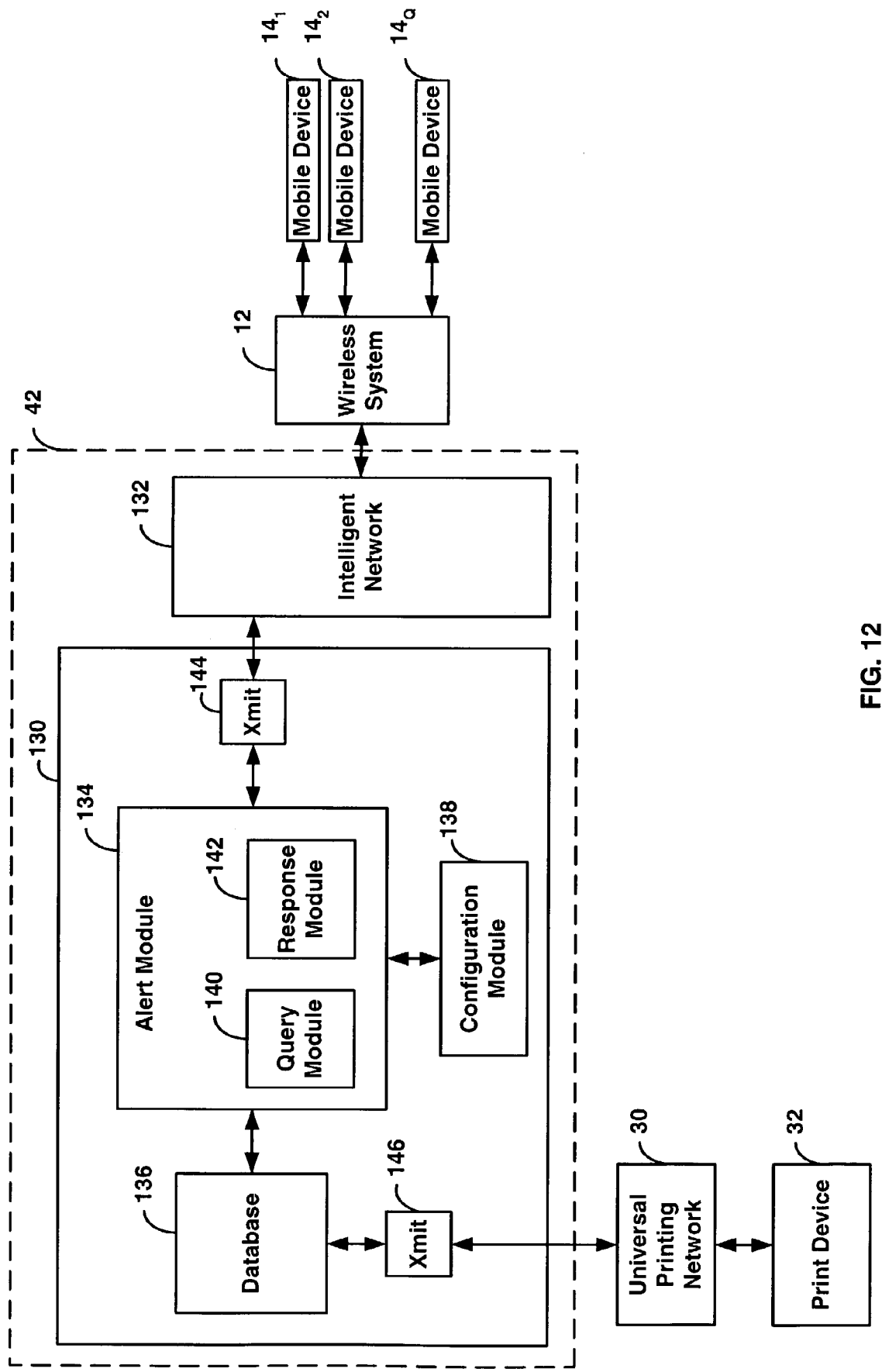
FIG. 12 is a block diagram of an exemplary embodiment of a content sourcing platform in accordance with this invention.

Referring now to FIG. 12, an exemplary embodiment of content sourcing platform 130 is described. For simplicity, only one content sourcing platform 130 is shown in FIG. 12, although one or more content sourcing platforms 130 may be coupled to universal printing network 30 and Intelligent Network 132. Content sourcing platform 130 includes alert module 134, database 136, configuration module 138 and transmitters 144 and 146. Content sourcing platform 130 may be used to provide content from database 136 to Mobile Device users, such as users of Mobile Devices $14_1, 14_2, \ldots, 14_Q$. Database 136 may be any conventional database, such as a SQL database, Oracle database, Seibel database, SAP database, or the like. Alternatively, database 136 may be an enterprise resource planning ("ERP") application.

Configuration module 138 permits Mobile Device users to set preferences for desired alerts related to data in database 136. The configuration module may, for example, provide a Web interface that allows users to specify alerts via the Internet. Alert module 134 performs alert matching based on user-specified alerts, provides data to users, and processes user print requests. In particular, query module 140 receives and processes requests for information in database 136 from Mobile Device users via transmitter 144, Intelligent Network 132 and wireless system 12. Response module 142 prompts users with print options for content included in database 136, processes user response to such requests, and provides print data to universal printing network 30 via transmitter 146.

For example, a financial institution may have a database 136 that includes real-time stock prices and other financial data, plus customer account data. The financial institution may use content sourcing platform 130 to provide its customers with Mobile Device access to the data included in database 136. A customer may, for example, communicate with content source 130 via SMS messages regarding the balance of her checking account. Query module 140 processes this request, and retrieves the desired information from database 136. Response module 142 then may use SMS messages to ask if the user would like to print a copy of the user's most recent account statement. If the user elects to obtain a printout, response module 142 transmits a copy of the statement to universal printing network 30 via transmitter 146. This entire exchange may be performed, for example, using the process described above in connection with FIG. 4.

As another example, an airline may have a database 136 that includes current flight status information, reservations and ticketing information, frequent flyer information and other information. The airline may use configuration module 138 to allow customers to specify alerts regarding the airline's scheduled flights. For example, a customer may request an alert in the event of a departure delay on flight number "XYZ." Alert module 134 periodically monitors flight status data included in database 136, and triggers an alert on the occurrence of the specified event. Thus, if database 136 indicates that flight XYZ is delayed, alert module 134 generates an SMS message that informs the user of the delay. Response module 142 then may use SMS messages to allow the user to change her flight, and may ask if the user would like to print a copy of the new travel itinerary. If the user elects to obtain a printout, response module 142 transmits a copy of the itinerary to universal printing network 30 via transmitter 146.

Figure 13:
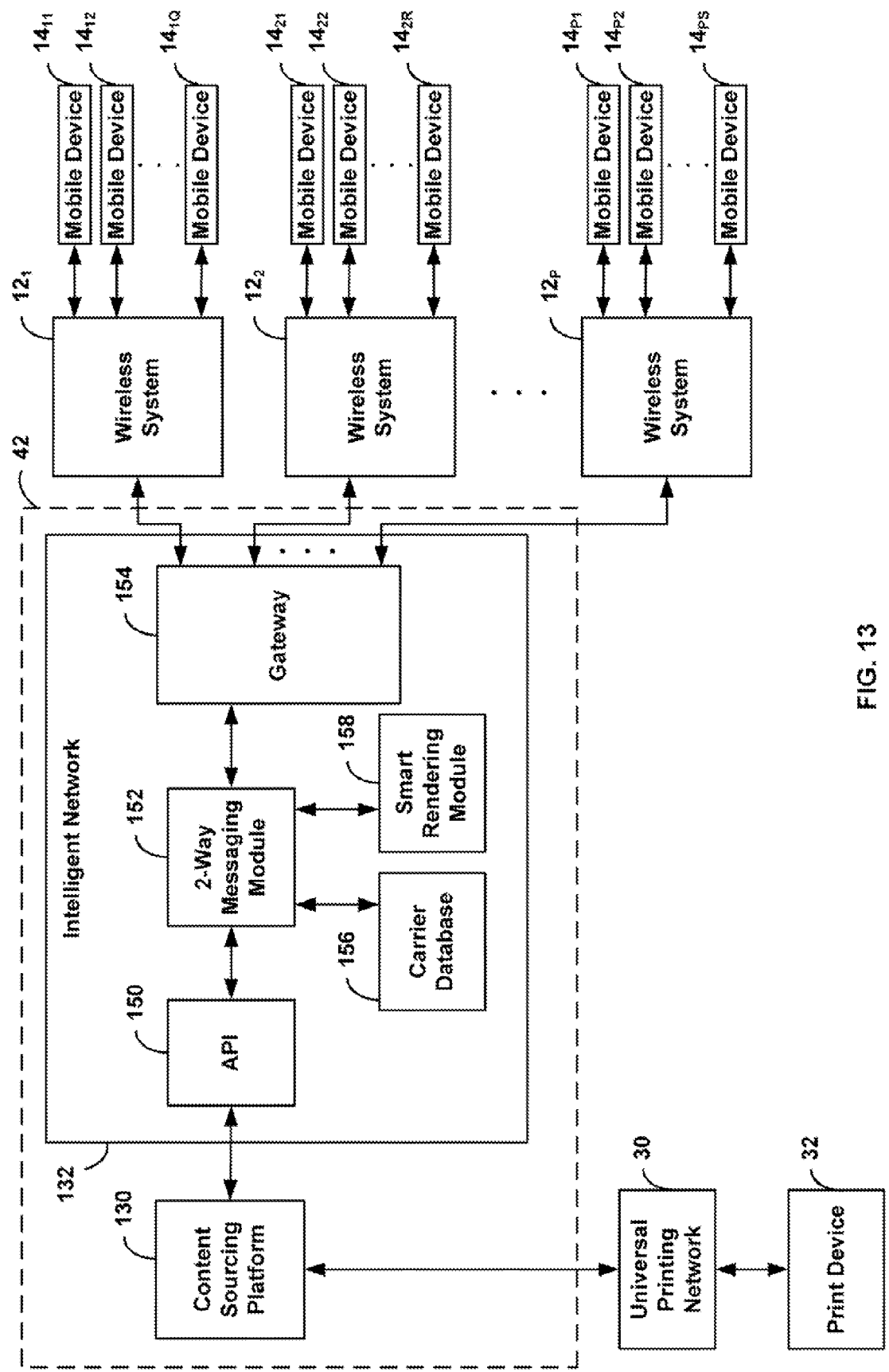
FIG. 13 is an exemplary embodiment of an intelligent network in accordance with this invention.

Referring now to FIG. 13, an exemplary embodiment of Intelligent Network 132 is described. Intelligent Network 132 acts like an intelligent communication channel that permits one or more distinct content sourcing platforms 130 to communicate SMS messages via one or more wireless systems $12_1, 12_2, \ldots, 12_P$ to any of Mobile Devices $14_{11}, 14_{12}, \ldots 14_{1Q}, 14_{21}, 14_{22}, \ldots, 14_{2R}, \ldots,$ and $14_{P1}, 14_{P2}, \ldots, 14_{PS}$. In particular, Intelligent Network 132 includes application program interface 150, two-way messaging module 152, gateway 154, carrier database 156 and smart rendering module 158.

Application program interface ("API") 150 allows one or more content sourcing platforms 130 to communicate SMS messages to Intelligent Network 132. For simplicity, a single content sourcing platform 130 is shown in FIG. 13, although Intelligent Network 132 typically may be coupled to more than one content sourcing platform. API 150 may be, for example, an XML-based application program interface module, or other similar open standards-based application program interface that may include software and/or hardware to interface content sourcing platform to Intelligent Network 132. In particular, content sourcing platform 130 may transmit an SMS message via API 150. The SMS message typically will include the message itself, plus a destination address (e.g., an email address, phone number, etc.). Intelligent Network 132 assigns each message a message ID that uniquely associates the message with the content sourcing platform 130 that generated the message.

Two-way messaging module 152 provides two-way communication between content sourcing platforms 130 and Mobile Devices $14_{11}, 14_{12}, \ldots 14_{1Q}, 14_{21}, 14_{22}, \ldots, 14_{2R}, \ldots,$ and $14_{P1}, 14_{P2}, \ldots, 14_{PS}$. Carrier database 156 maps destination addresses to the corresponding wireless system $12_1, 12_2, \ldots, 12_P$ associated with that address. Thus, content sourcing platforms 130 need only know the designated recipient's destination address, and need not know the specific wireless system that the recipient uses. Smart rendering module 158 formats the SMS message based on the device characteristics of the designated Mobile Device. For example, if an SMS message includes both text and graphics, but the designated Mobile Device includes only an alphanumeric display, smart rendering module 158 may reformat the message to only include the text portion of the SMS message. Thus, content sourcing platforms 130 need not format customized SMS messages for each individual recipient. Gateway 154 functions as a universal gateway that allows Intelligent Network 132 to communicate via the various wireless system $12_1, 12_2, \ldots, 12_P$. Thus, content sourcing platforms 130 need not include separate gateways for each wireless system that its customers use.

The foregoing merely illustrates the principles of this invention, and various modifications can be made by persons of ordinary skill in the art without departing from the scope and spirit of this invention.

We claim:

1. A method for providing print services, the method comprising:

providing a content sourcing platform coupled via a gateway to a plurality of unique wireless systems, each wireless system associated with a plurality of mobile devices, the gateway enabling the content sourcing platform to communicate via any of the wireless systems to the mobile devices associated with those wireless systems;

coupling a plurality of printing devices to the content sourcing platform via a printing network, forming networked printers;

communicating at least one data alert message from the content sourcing platform to the mobile devices using an asynchronous data alert message service, wherein the at least one data alert message comprises an alert message comprising an alert regarding the availability of a printable document and a means for initiating the printing of the printable document with a print request;

selecting at least one printing device to generate a polling request and print the printable document, wherein the step of identifying at least one printing device comprises:

generating a document ID by the content sourcing platform, the document ID being uniquely associated with the printable document, providing the document ID to a user of at least one of the mobile devices;

accepting the input of the document ID, by the user, into at least one of the system printers, forming a selected printer; and transmitting a polling request by the selected printer to the printing network;

receiving at least one print request at the content sourcing platform from at least one of the mobile devices using the asynchronous data alert message service; and sending the printable document from the content sourcing platform to the printing network comprising a spooling server adapted to: (a) receive and store the requested document, (b) receive over a network a polling request from a printer polling device associated with the print device, the polling request identifying the requested document stored at the spooling server, and (c) transmit the requested document to the printer polling device in response to the polling request.

2. The method of claim 1, wherein the mobile device comprises any of a pager, personal digital assistant, cell phone, wireless handheld device, and handheld computer.

3. The method of claim 1, wherein the asynchronous data alert message service comprises a short message service.

4. The method of claim 1, wherein the asynchronous data alert message service comprises a multimedia message service.

5. The method of claim 1, further comprising:
printing the document at a printer coupled to the printer polling device.

6. The method of claim 1, wherein the network comprises any of a local area network, a wide area network, a global network, and the Internet.

7. The method of claim 1, wherein the document comprises any of a poster, an image, a coupon, a ticket, a certificate, a check, a list, a schedule, a periodical, a unit of currency, a negotiable instrument, a stamp, a bill of lading, a lottery or gaming ticket, a token, a food stamp, a license, a permit, a pass, a passport, a ballot, a citation, identification, a copy-protection key, a proof-of-purchase, a warranty, a receipt, a transcript, a library card, a prospectus, or a financial statement.

8. The method of claim 1, wherein receiving further comprises receiving information from the requesting mobile device that identifies the print device.

9. The method of claim 1, wherein receiving further comprises receiving from the requesting mobile device an address associated with the print device.

10. The method of claim 1, wherein the print device comprises a facsimile machine, and receiving further comprises receiving from the requesting mobile device a telephone number associated with the fax machine.

11. The method of claim 1, wherein information comprises transportation information.

12. The method of claim 1, wherein information comprises financial information.

13. The method of claim 1, wherein communicating further comprises communicating information in response to preselected alert criteria.

14. A system for providing print services, the system comprising:
a content sourcing platform coupled via a gateway to a plurality of unique wireless systems, each wireless system associated with a plurality of mobile devices, the gateway enabling the content sourcing platform to communicate via any of the wireless systems to the mobile devices associated with those wireless systems;
a plurality of printing devices coupled to the content sourcing platform via a printing network, forming networked printers;
a means for communicating at least one data alert message from the content sourcing platform to the mobile devices using an asynchronous data alert message service, wherein the at least one data alert message comprises an alert message comprising an alert regarding the availability of a printable document and a means for initiating the printing of the printable document with a print request;
a means for selecting at least one printing device to generate a polling request and print the printable document, wherein the step of identifying at least one printing device comprises:
generating a document ID by the content sourcing platform, the document ID being uniquely associated with the printable document, providing the document ID to a user of at least one of the mobile devices;
accepting the input of the document ID, by the user, into at least one of the system printers, forming a selected printer; and
transmitting a polling request by the selected printer to the printing network;
a means for receiving at least one print request at the content sourcing platform from at least one of the mobile devices using the asynchronous data alert message service; and
a means for sending the printable document from the content sourcing platform to the printing network comprising a spooling server adapted to: (a) receive and store the requested document, (b) receive over a network a polling request from a printer polling device associated with the print device, the polling request identifying the requested document stored at the spooling server, and (c) transmit the requested document to the printer polling device in response to the polling request.

15. The system of claim 14, wherein the mobile device comprises any of a pager, personal digital assistant, cell phone, wireless handheld device, and handheld computer.

16. The system of claim 14, wherein the asynchronous data alert message service comprises a short message service.

17. The system of claim 14, wherein the asynchronous data alert message service comprises a multimedia message service.

18. The system of claim 14, wherein the network comprises any of a local area network, a wide area network, a global network, and the Internet.

19. The system of claim 14, wherein the document comprises any of a poster, an image, a coupon, a ticket, a certificate, a check, a list, a schedule, a periodical, a unit of currency, a negotiable instrument, a stamp, a bill of lading, a lottery or gaming ticket, a token, a food stamp, a license, a permit, a pass, a passport, a ballot, a citation, identification, a copy-protection key, a proof-of-purchase, a warranty, a receipt, a transcript, a library card, a prospectus, or a financial statement.

20. The system of claim 14, wherein the means for receiving further comprises means for receiving information from the requesting mobile device that identifies the print device.

21. The system of claim 14, wherein the means for receiving further comprises means for receiving from the requesting mobile device an address associated with the print device.

22. The system of claim 14, wherein the print device comprises a facsimile machine, and the means for receiving further comprises means for receiving from the requesting mobile device a telephone number associated with the fax machine.

23. The system of claim 14, wherein information comprises transportation information.

24. The system of claim 14, wherein information comprises financial information.

25. The system of claim 14, wherein the means for communicating further comprises means for communicating information in response to pre-selected alert criteria.

* * * * *